US005880079A

United States Patent [19]

Polotti et al.

[11] Patent Number: 5,880,079

[45] Date of Patent: Mar. 9, 1999

[54] BLEACHING COMPOSITIONS

[75] Inventors: Gianmarco Polotti, Sesto San Giovanni; Stefano Scialla; Raffaele Scoccianti, both of Rome, all of Italy

[73] Assignee: The Procter & Gamble Company, Cincinnati, Ohio

[21] Appl. No.: 750,241

[22] PCT Filed: May 18, 1995

[86] PCT No.: PCT/US95/06222

§ 371 Date: Feb. 28, 1997

§ 102(e) Date: Feb. 28, 1997

[87] PCT Pub. No.: WO95/35255

PCT Pub. Date: Dec. 28, 1995

[30] Foreign Application Priority Data

Jun. 17, 1994 [EP] European Pat. Off. .............. 94870097

[51] Int. Cl.[6] ............................ C11D 3/39; C11D 3/395; C01B 15/01; C01B 15/10

[52] U.S. Cl. ............... 510/309; 252/186.22; 252/186.26; 252/186.27; 252/186.28; 252/186.29

[58] Field of Search ......................... 252/186.22, 186.23, 252/186.26, 186.27, 186.28, 186.29; 510/303, 309

[56] References Cited

U.S. PATENT DOCUMENTS

| | | | |
|---|---|---|---|
| 3,825,509 | 7/1974 | Miller . | |
| 4,039,475 | 8/1977 | Oosterwisk et al. . | |
| 4,396,527 | 8/1983 | Maysuyama et al. | 252/186.23 |
| 4,401,835 | 8/1983 | Tarasov | 568/559 |
| 4,440,885 | 4/1984 | Tamosauskas | 524/57 |
| 4,552,682 | 11/1985 | Black et al. | 252/186.26 |
| 4,927,559 | 5/1990 | Schwarz et al. | 252/186.39 |
| 5,409,632 | 4/1995 | Showell et al. | 252/186.23 |

FOREIGN PATENT DOCUMENTS

| | | |
|---|---|---|
| 0 598 170 A1 | 5/1994 | European Pat. Off. . |

*Primary Examiner*—Joseph D. Anthony
*Attorney, Agent, or Firm*—Robert B. Aylor

[57] ABSTRACT

Compositions are described which are formulated as emulsions of a hydrophilic nonionic surfactant and a hydrophobic nonionic surfactant, and which further comprise an effective amount of benzoyl peroxide. Preferred compositions further comprise hudrogen peroxide. The compositions herein are particularly useful for the bleaching of fabrics.

11 Claims, No Drawings

BLEACHING COMPOSITIONS

This application is a 35 U.S.C. 371 application of PCT/US95/06222 filed May 18, 1995.

TECHNICAL FIELD

The present invention relates to bleaching compositions. The compositions of the present invention are particularly useful for laundry bleaching.

BACKGROUND

Compositions for the bleaching of laundry have been extensively described in the art. Bleaching compositions can be classified into peroxide bleaching compositions and hypochlorite bleaching compositions. Peroxide bleaching compositions have the advantage over hypochlorite bleaching compositions that they are generally considered as being somewhat safer to fabrics, specifically to colored fabrics. Peroxide compositions however have the inconveniency that they are often chemically unstable, which makes it difficult to formulate peroxide bleaching compositions which are sufficiently stable to be commercialized. A possible solution to this problem consists in formulating compositions with a high level of peroxide, to extend the "effective" period of the composition. A possible drawback of this solution is that compositions may reach the user which still comprise a high amount of peroxide, whereby possible skin itching may occur if the user's skin comes in contact with the peroxide composition. This itching phenomenon is quite moderate and fully reversible, but is does constitute potential discomfort for the user.

Also, peroxide species are poorly effective in bleaching at lower temperatures, so that it is required to formulate activated peroxide bleaching compositions for use across a wider range of temperatures. Activated bleaching compositions comprise a bleach activator, typically a peracid precursor, which will react in an aqueous medium with hydrogen peroxide to form the corresponding peracid. This peracid is more effective at lower temperatures.

It is thus an object of the present invention to formulate a peroxide bleaching composition which is stable, without having to resort to using higher amounts of peroxide, and which can be activated in a stable manner.

It is also an object of the present invention to formulate a bleaching composition with superior bleaching performance.

In response we have now found that this object can be met by formulating an aqueous emulsion of nonionic surfactants, in which benzoyl peroxide is incorporated. Benzoyl peroxide may constitute the bleaching peroxide specie alone, as it hydrolyzes in aqueous medium in neutral/alkaline pH so as to generate a peracid. But in a preferred embodiment of the present invention, a composition is formulated which comprises hydrogen peroxide in one phase of the emulsion and benzoyl peroxide in the other phase of the emulsion.

Bleaching compositions formulated as emulsions have been disclosed in EP 598 170. The compositions in '170 are emulsions comprising hydrogen peroxide in one phase and a hydrophobic liquid ingredient in the other phase. This hydrophobic liquid ingredient can be a peracid precursor.

SUMMARY OF THE INVENTION

The present invention is an aqueous bleaching composition in the form of an emulsion comprising a hydrophilic nonionic surfactant and a hydrophobic nonionic surfactant, said emulsion further comprising an effective amount of benzoyl peroxide.

DETAILED DESCRIPTION OF THE INVENTION

The compositions according to the present invention are stable aqueous emulsions of nonionic surfactants. By stable emulsion it is meant an emulsion which does not macroscopically separate into distinct layers, upon standing for at least two weeks at 20° C., more preferably at least six months. As used herein, the term emulsion refers to emulsions which are obtained when smaller amounts of benzoyl peroxide are used, so that it is completely soluble in the hydrophobic nonionic surfactant, as well as suspensions which are obtained when the level of Benzoyl peroxide is increased to the point where part of it is not dissolved in the hydrophobic nonionic surfactant, and aggregates of Benzoyl Peroxide are formed in the aqueous phase.

The compositions according to the present invention are aqueous. Accordingly, the compositions according to the present invention comprise from 10% to 95% by weight of the total composition of water, preferably from 30% to 90%, most preferably from 60% to 85%. Deionized water is preferably used.

The compositions according to the present invention are emulsions of nonionic surfactants. Said emulsions of nonionic surfactants comprise at least two nonionic surfactants. In order to form emulsions which are stable, said two nonionic surfactants must have different HLB values (hydrophilic lipophilic balance), and preferably the difference in value of the HLBs of said two surfactants is at least 1, more preferably at least 3. By appropriately combining at least two of said nonionic surfactants with different HLBs in water, emulsions according to the present invention will be formed.

One of said nonionic surfactants used herein is a nonionic surfactant with an HLB above 11 (herein referred to as hydrophilic nonionic surfactant), whereas the other one is a nonionic surfactant with an HLB below 10 (herein referred to as hydrophobic nonionic surfactant). Preferably, the concentration ratio between hydrophilic and hydrophobic surfactants should be chosen in such a way that the weighted average of their HLB is of from 9 to 11. The weighted average HLB is defined as: (% of hydrophilic x HLB of hydrophilic)+(% of hydrophobic x HLB of hydrophobic) where:

% of hydrophilic=[hydrophilic]/total [hydrophilic+hydrophobic],

% of hydrophobic=[hydrophobic]/total [hydrophilic+hydrophobic], and

% of hydrophilic+% hydrophobic=1.

By [hydrophilic] and [hydrophobic] we mean the weight % concentration, based on the total formula, of the hydrophilic and hydrophobic surfactants, respectively. In addition to the above two surfactants, the compositions according to the present invention may comprise any other nonionic surfactants, but preferably the weighted average HLB, calculated with the additional surfactants, still falls in the specified range.

Suitable nonionic surfactants for use herein include alkoxylated fatty alcohols. Indeed, a great variety of such alkoxylated fatty alcohols are commercially available which have very different HLB values (hydrophilic lipophilic balance). The HLB values of such alkoxylated nonionic surfactants depend essentially on the nature of the alkoxylation and the degree of alkoxylation. Hydrophilic nonionic surfactants tend to have a higher degree of alkoxylation, while hydrophobic surfactants tend to have a lower degree of alkoxylation and a long chain fatty alcohol. Surfactants catalogues are available which list a number of surfactants including nonionics, together with their respective HLB values.

The compositions according to the present invention comprise from 2% to 70% by weight of the total composition of said hydrophilic and hydrophobic nonionic surfactants, preferably from 3% to 40%, most preferably from 4% to 30%.

As an essential ingredient, the compositions according to the present invention further comprise an effective amount of benzoyl peroxide in the hydrophobic phase. By effective amount, it is meant herein an amount sufficient for the bleaching of fabrics. According to the present invention, benzoyl peroxide can be used with or without hydrogen peroxide. When it is used without hydrogen peroxide, it simply hydrolyzes in neutral/alkaline medium, i.e. in the bleaching liquor formed by diluting the compositions of the present invention in water, so as to form peroxybenzoate which is the bleaching specie. Accordingly, when benzoyl peroxide is used alone, the compositions herein comprise from 1% to 20% by weight of the total composition, preferably from 2 % to 10% by weight.

As an alternative, benzoyl peroxide can be used herein together with hydrogen peroxide. Both ingredients are prevented from reacting in the composition, as hydrogen peroxide is incorporated in the hydrophilic phase, while benzoyl peroxide is incorporated in the hydrophobic phase. Thus both ingredients are kept separate until the composition is diluted in an aqueous medium for use. Upon dilution, the emulsion structure is ruptured, and benzoyl peroxide is perhydrolyzed by hydrogen peroxide so as to form peroxybenzoate. In this scenario, two moles of peroxybenzoate are formed per mole of benzoyl peroxide, whereas in the previously described scenario, only one mole of peroxybenzoate was formed per mole of benzoyl peroxide.

Accordingly, when the compositions herein are formulated with hydrogen peroxide, they should comprise from 1% to 10% by weight of the total composition of hydrogen peroxide, preferably from 2 % to 4%, and from 1% to 20% by weight of the total composition of benzoyl peroxide, preferably from 1% to 10%. Of course, instead of hydrogen peroxide itself, one may use sources of hydrogen peroxide. Suitable sources of hydrogen peroxide for use herein include percarbonates, perborates, persulfates and the like.

We have observed that the pH of the compositions herein plays a role in the chemical stability of the composition. Accordingly, the compositions herein are preferably formulated at a pH of from 1 to 6, preferably 2 to 5. A variety of suitable means can be used for adjusting the pH of the compositions, including organic or inorganic acids, alkanolamines and the like. It may be advantageous to use alkanolamines, in particular monoethanolamine, inasmuch as they have an additional effect of regulating the viscosity of the emulsion, without compromising on its physical stability.

The compositions herein may comprise a variety of optional ingredients. A preferred optional feature of the compositions herein is the presence of radical scavengers, which are beneficial to the stability of the compositions herein. Suitable radical scavengers for use herein include the well-known substituted mono and di hydroxy benzenes and their analogs, alkyl and aryl carboxylates, and mixtures thereof. Preferred radical scavengers for use herein include butyl hydroxy toluene, mono-tert-butyl hydroquinone, benzoic acid, toluic acid, t-butyl catechol, benzylamine, 1,1,3-tris(2-methyl4-hydroxy-5-t-butylphenyl) butane, commercially available under the trade name Topanol CA ® ex ICI, as well as n-propyl-gallate. Radical scavengers, when used, are typically present herein in amounts ranging from 0.01% to 2% by weight of the total composition, preferably 0.01% to 0.2%.

It may also be useful to formulate chelants herein, which may further improve the chemical stability of the compositions herein. Typical chelants useful herein include phosphonates, ethylene diamine dissuccinic acid, dipicolinic acid and diethylene triamine penta acetate and the like. Suitable levels for chelants herein are comprised between 0.01% and 5% by weight of the total composition. An increase in chemical stability could be observed by a synergistic action of both the previous ingredients, radical scavengers and chelants, combined together.

The compositions herein may further comprise other optionals, including anionic and cationic surfactants, to be formulated in the hydrophilic phase herein, other bleach activators to be used in mixture with benzoyl peroxide, such as acetyl triethyl citrate, builders and chelants, as well as aesthetics, including dyes and perfumes and the like.

The compositions according to the present invention are particularly useful as laundry bleaches, including as pretreaters, i.e compositions which are dispensed and left to act onto fabrics before they are washed. Compositions herein can be formulated as laundry additives to be used before or together with detergents in an aqueous medium to boost their performance, or as detergent compositions per se. Compositions herein can also be used as automatic or hand dishwashing compositions, as hard surface cleaners, as denture cleansers, or as carpet cleaners.

The present invention further encompasses a process for the manufacture of the compositions described herein. The process according to the present invention comprises at least three steps:

In the first step, a hydrophobic mixture is prepared which comprises said hydrophobic nonionic surfactant, said benzoyl peroxide, together with other, optional, hydrophobic ingredients which are to be formulated in the composition, such as perfumes, solvents, enzymes, bleach activators and polymers.

In the second step, a hydrophilic mixture is prepared which comprises at least said water, and said hydrophilic nonionic surfactant. Said hydrophilic mixture preferably further comprises other hydrophilic ingredients which are to be formulated in the composition such as dyes, optical brighteners, builders, chelants, hydrogen peroxide or sources thereof and buffering agents.

Naturally, said first and said second steps can be performed in any order, i.e second step first is also suitable.

In the third step of the process according to the present invention, said hydrophobic mixture and said hydrophilic mixture are mixed together.

EXAMPLES

Experimental data

| | |
|---|---|
| Composition 1: | |
| Benzoyl Peroxide | 2% |
| H2O2 | 4% |
| Sodium Coconut Alkyl Sulfate | 5% |
| Dobanol ® 23-3 | 5% |
| Dobanol ® 91-8 | 3% |
| Coconut trimethyl ammonium chloride | 1% |
| Water and minors | to balance |
| pH | 4 |
| Composition 2 | |
| Benzoyl Peroxide | 3.5% |
| H2O2 | 4% |
| Sodium Coconut Alkyl Sulfate | 2% |
| Lutensol ® TO3 | 7% |
| Dobanol ® 45-7 | 8% |
| Water and minors | to balance |
| pH | 4 |

-continued

| Composition 3 | |
|---|---|
| Benzoyl Peroxide | 3.5% |
| Sodium Coconut Alkyl Sulfate | 0.5% |
| Dobanol 45-7 | 11% |
| Lutensol TO3 | 4% |
| Water and minors | to balance |
| pH | 4 |

The technical data hereinafter illustrates the benefits obtained from benzoyl peroxide, according to the present invention.

The tests are performed on cotton fabrics stained as indicated below. 0.2 g of tested bleaching composition is applied on each stain. The fabrics (6 replicates each) are then washed in a Launder-o-meter, using 5 g of Dash ultra Powder in 500 ml water. There is no waiting period between application of tested bleaching composition and washing. A reference bleaching composition is used which is an activated bleaching composition comprising hydrogen peroxide and acetyl triethyl citrate, as disclosed in WO 93/12067. Specifically, the reference composition comprised 6% H202, 3.5% Acetyl triethyl citrate, 7% Lutensol ®TO3, 8% Dobanol ® 45-7, 2% Sodium Alkyl Sulfate, water to balance, pH=4. A comparison is made, in a single variable test, between benzoyl peroxide (the prototype) and acetyl triethyl citrate (the reference) at the same level (3.5%).

The results are expressed as panel score units, as evaluated by expert panel judges.

| | prototype vs. reference | |
|---|---|---|
| | 40° C. | 60° C. |
| Tomato | 4.0s | 3.5s |
| Tea | 1.2s | 1.7s |
| Cocoa | 0.3 | 1.2s |
| Grass | 0.2s | 0.1 |
| Wine | 0.7s | 1.1s |
| Vegetal Oil | 3.2s | 2.8s |
| Blood | 1.2s | 0.8 |

The results above indicate a strong benefit on all stains, using benzoyl peroxide instead of acetyl triethyl citrate, at a given level of hydrogen peroxide, and the same level of activator.

Using the same test conditions as above, a similar comparison was made between a prototype with 4% H202 and 2% benzoyl peroxide, vs a reference comprising 7% of H202.

| | prototype vs. reference | |
|---|---|---|
| | 40° C. | 60° C. |
| Tomato | 2.2s | 2.2s |
| Tea | 1.2s | 0.4 |
| Cocoa | 0.4 | 0.7s |
| Grass | 1.0s | 0.4 |
| Wine | 0.8s | 0.2 |
| Vegetal Oil | 2.2s | 1.7s |
| Make up | 1.8s | 0.9s |

The results above show that superior results are still obtained, even though the level of hydrogen peroxide was reduced from 7% in reference, to 4% in prototype.

We claim:

1. An aqueous bleaching composition in the form of an emulsion comprising water and at least one hydrophilic nonionic surfactant and at least one hydrophobic nonionic surfactant wherein the difference in HLB value between the said hydrophilic surfactant and said hydrophobic surfactant is at least 1 and wherein said emulsion further comprises from 1% to 2% of benzoyl peroxide and from 1% to 10% of hydrogen peroxide or a source of from 1% to 10% hydrogen peroxide.

2. A composition according to claim 1 wherein said source of hydrogen peroxide is hydrogen peroxide.

3. A composition according to claim 1 which comprises from 1% to 8% by weight of the total composition of hydrogen peroxide or a source of from 1% to 8% hydrogen peroxide.

4. A composition according to claim 3 which comprises from 2% to 10% by weight of the total composition of benzoyl peroxide.

5. A composition according to claim 3 which comprises from about 2% to about 4% by weight of the total composition of hydrogen peroxide.

6. A composition according to claim 1 wherein said hydrophobic nonionic surfactant has an HLB below 10.

7. A composition of claim 6 wherein the difference in HLB value between said hydrophobic and hydrophilic surfactant is at least 3.

8. A composition according to claim 1 wherein said hydrophilic nonionic surfactant has an HLB above 11.

9. A composition of claim 8 wherein the difference in HLB value between said hydrophilic and hydrophobic nonionic surfactant is at least 3.

10. A composition according to claim 1 having a pH of from 1 to 6.

11. A process for the manufacture of a composition according to claim 1 which comprises the steps of:

Preparing a hydrophobic mixture comprising said hydrophobic nonionic surfactant and said benzoyl peroxide, together with other, optional, hydropbic ingredients which are to be formulated in the composition, such as perfumes, solvents, enzymes, bleach activators and polymers;

Preparing a hydrophilic mixture comprising at least said water, and said hydrophilic nonionic surfactant and possibly other, optional, hydrophilic ingredients which are to be formulated in the composition such as dyes, optical brighteners, builders, chelants, hydrogen perioxide or sources thereof and buffering agents, Wherein benzoyl peroxide is added in either said hydrophobic or said hydrophilic mixtures, or said derivatives thereof are added in said hydrophobic phase;

Subsequently mixing said hydrophobic mixture and said hydrophilic mixture together.

* * * * *